No. 726,972. PATENTED MAY 5, 1903.
I. McCOLLISTER.
ONION SETTER.
APPLICATION FILED AUG. 5, 1901. RENEWED NOV. 28, 1902.
NO MODEL.
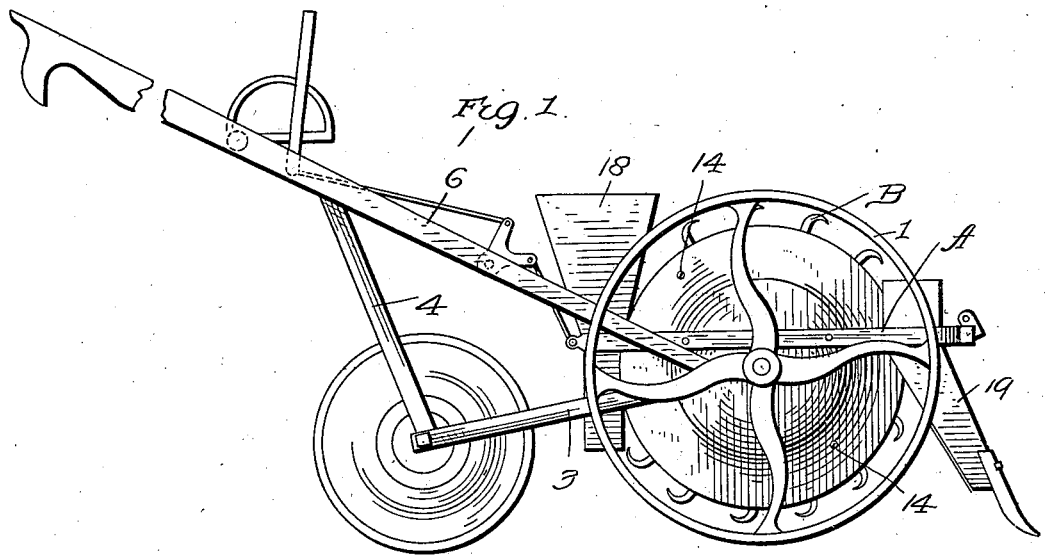
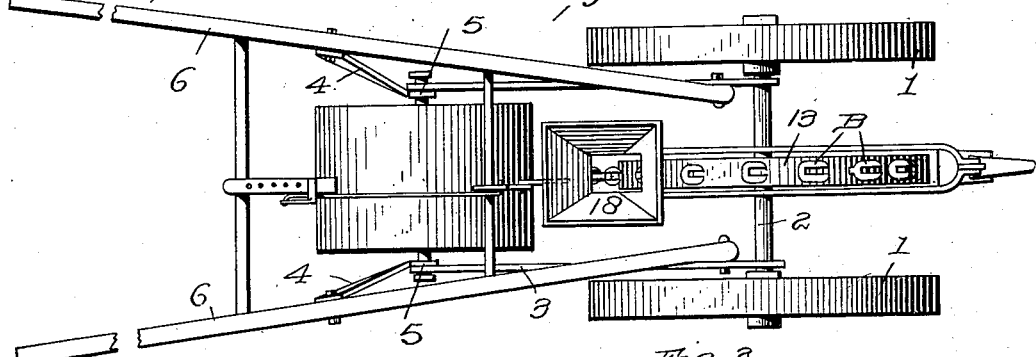
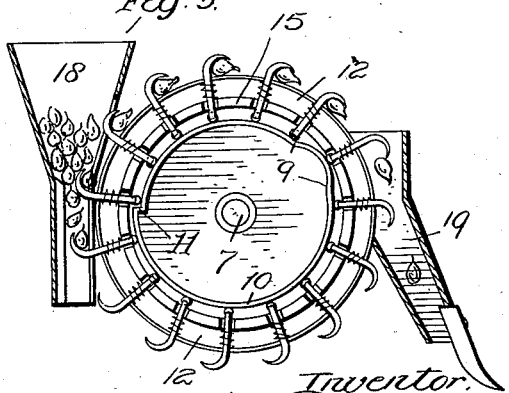

No. 726,972. Patented May 5, 1903.

UNITED STATES PATENT OFFICE.

IRVIN McCOLLISTER, OF WILMINGTON, OHIO.

ONION-SETTER.

SPECIFICATION forming part of Letters Patent No. 726,972, dated May 5, 1903.

Application filed August 5, 1901. Renewed November 28, 1902. Serial No. 133,111. (No model.)

*To all whom it may concern:*

Be it known that I, IRVIN McCOLLISTER, a citizen of the United States, residing at Wilmington, in the county of Clinton and State of Ohio, have invented a new and useful Garden Implement—viz., an "onion-setter."

My invention comprises the features and combination of parts hereinafter described, and particularly pointed out in the claims.

Figure 1 is a side elevation of the entire machine; Fig. 2, a top view of the machine; Fig. 3, a vertical section of a part of the machine with one-half of wheel 12, below described, removed; and Fig. 4 is a rear and side view of one of the carriers or hooks B, as shown in Fig. 3.

The ground-wheels 1 1, their axle 2, the side supports 3 3, joined with the braces 4 4 on the axle of the roller at 5 5, and the handles 6 6 constitute the framework of the implement. The axle 2 is encircled, but untouched, by a cam-wheel 7, held stationary by frame A. The track 8 on the cam-wheel 7 is raised between the points 9 9 of its outer rim, with a gradual rise from 10 to 11, at which latter point there is an abrupt offset of one-half inch, continuing to the rise 9 9. The cam-wheel 7 and track 8 are inclosed by a hollow and circular wheel 12, made in halves, one half of wheel 12 not being attached to axle 2, but is cut out of sufficient circumference to admit the cam-wheel 7. The other half of wheel 12 is fitted on the axle 2 at 13, halves bolted together at 14 14. The inner surface of each half of the wheel 12 is provided with a rim 15, raised three-sixteenths of an inch, full, and the rim is divided into fifteen equal parts, with a space three-sixteenths of an inch wide, full, separating and being between every two parts of rim 15. The outer rim of each half of the wheel 12 contains fifteen notches of an equal distance apart, three-sixteenths of an inch square, conforming to the spaces in rim 15, so that in fitting wheel 12 together the carriers or hooks will stand and be held in place, as shown by Fig. 3.

The carriers or hooks B are shown in rear and side view by Fig. 4, and Fig. 3 shows them in position. The carriers or hooks B are of metal and three-eighths of an inch square, intended to be held in position by the halves of the wheel 12 when fitted together, so that they can move easily up and down, but not turn.

16 is a roller on the end of the hook B.

17 is a spiral spring, and 18 is a hopper to contain the onion-sets, through which the carriers or hooks B pass, as shown by Fig. 3.

The carriers B are made up of the radial stems having the hooks on their outer ends. Starting, say, at point 10, the hook travels around the track 8, and as the track at this point begins to rise the prongs of the hook are forced outward farther and farther until it reaches the point 11, when they are extended from the rim of the wheel 12 one inch. As the hook is forced out in its course from 10 to 11 the spiral spring 17 becomes more tense, and when released at the offset at point 11 the spring 17 forces the hook back on the track 8 at point 11, bringing the prongs of the hooks back to within three-eighths of an inch of the rim of the wheel 12. The hook when extended, as above described, is passing through the bottom of the hopper 18, hooks extending upward, and the onion drops upon the hook, as shown by Fig. 3. The onion is then carried upward through the hopper, and when the hook springs back to its place at point 11 the onion is firmly held between the hooks and the rim of the wheel 12, while the hook B travels on the track 8 around to point 9, where the prongs begin to point downward or invert, and the rise on the track between points 9 9 forces the prongs of the hook outward until the onion is released and drops through the shoe 19 into the ground.

What I claim as my invention, and desire to secure by Letters Patent, is—

1. In combination in an onion-setter, a rotating wheel 12, a framework and carrier-wheels, a series of carriers B having their hooked ends overlying the peripheral surface of the rotating wheel and carried by said wheel, said carriers having their stems extending radially into the wheel, a cam within the wheel for operating the carriers as the wheel revolves, a hopper on one side of the wheel through which the hooked carriers pass upwardly so that the seed can lie in the space between the hook and the surface of the wheel and a discharge-chute for the seed, substantially as described.

2. In combination in an onion-setter, a rotating wheel 12, a framework and carrier-wheels, a series of carriers B having their hooked ends overlying the said wheel, said carriers having their stems extending radially into the wheel, a cam within the wheel for operating the carriers as the wheel revolves, a hopper on one side of the wheel through which the hooked carriers pass upwardly so that the seed can lie in the space between the hook and the surface of the wheel and a discharge-chute for the seed, the said wheel being formed in two parts with the stems of the carriers between said parts, substantially as described.

In testimony whereof I have signed my name to this specification in the presence of two subscribing witnesses.

IRVIN McCOLLISTER.

Witnesses:
H. G. CARTWRIGHT,
I. T. CARTWRIGHT.